(12) United States Patent
French et al.

(10) Patent No.: US 6,381,791 B1
(45) Date of Patent: May 7, 2002

(54) WASHING MACHINE TUB SPEED CONTROL METHOD AND APPARATUS

(75) Inventors: Alan P. French, Powell, OH (US); John S. Thorn, Florissant, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/577,754

(22) Filed: May 23, 2000

Related U.S. Application Data

(63) Continuation-in-part of application No. 09/197,272, filed on Nov. 20, 1998, now Pat. No. 6,282,965.

(51) Int. Cl.[7] .............................................. D06F 33/02
(52) U.S. Cl. ........................ 8/159; 68/12.02; 68/12.04
(58) Field of Search ........................... 8/159; 68/12.02, 68/12.04, 12.06

(56) References Cited

U.S. PATENT DOCUMENTS

| | | | |
|---|---|---|---|
| 4,986,092 A | 1/1991 | Sood et al. ..................... 68/12 |
| 5,070,565 A | 12/1991 | Sood et al. ..................... 8/159 |
| 5,325,677 A | * 7/1994 | Payne et al. ................ 68/12.04 |
| 5,333,474 A | 8/1994 | Imai et al. .................. 68/12.16 |
| 5,561,993 A | 10/1996 | Elgersma et al. ............. 68/23.2 |
| 5,682,634 A | * 11/1997 | Cheong et al. ................. 8/159 |
| 5,713,221 A | 2/1998 | Myers et al. .............. 68/12.06 |
| 5,720,065 A | * 2/1998 | Myers et al. ................... 8/159 |

FOREIGN PATENT DOCUMENTS

| | | |
|---|---|---|
| DE | 4038178 A | 6/1992 |
| EP | 0523371 A | 1/1993 |
| EP | 0684334 A | 11/1995 |
| EP | 0792963 A | 9/1997 |
| EP | 0969133 A | 1/2000 |
| GB | 2271837 A | 4/1994 |
| GB | 2295160 A | 5/1996 |

* cited by examiner

*Primary Examiner*—Philip Coe
(74) *Attorney, Agent, or Firm*—Howrey Simon Arnold & White, LLP

(57) ABSTRACT

A system and method for controlling the rotation speed of a washing machine tub includes receiving an indication of the actual tub rotation speed and comparing the actual tub rotation speed to a set point speed to calculate a speed error. One or more gain factors are applied to the speed error to calculate a correction factor. Adaptive gain control is used, wherein the gain factors are adjusted in response to system parameters, including the actual or desired tub rotation speed, speed error, average torque demand, average power, etc.

24 Claims, 8 Drawing Sheets

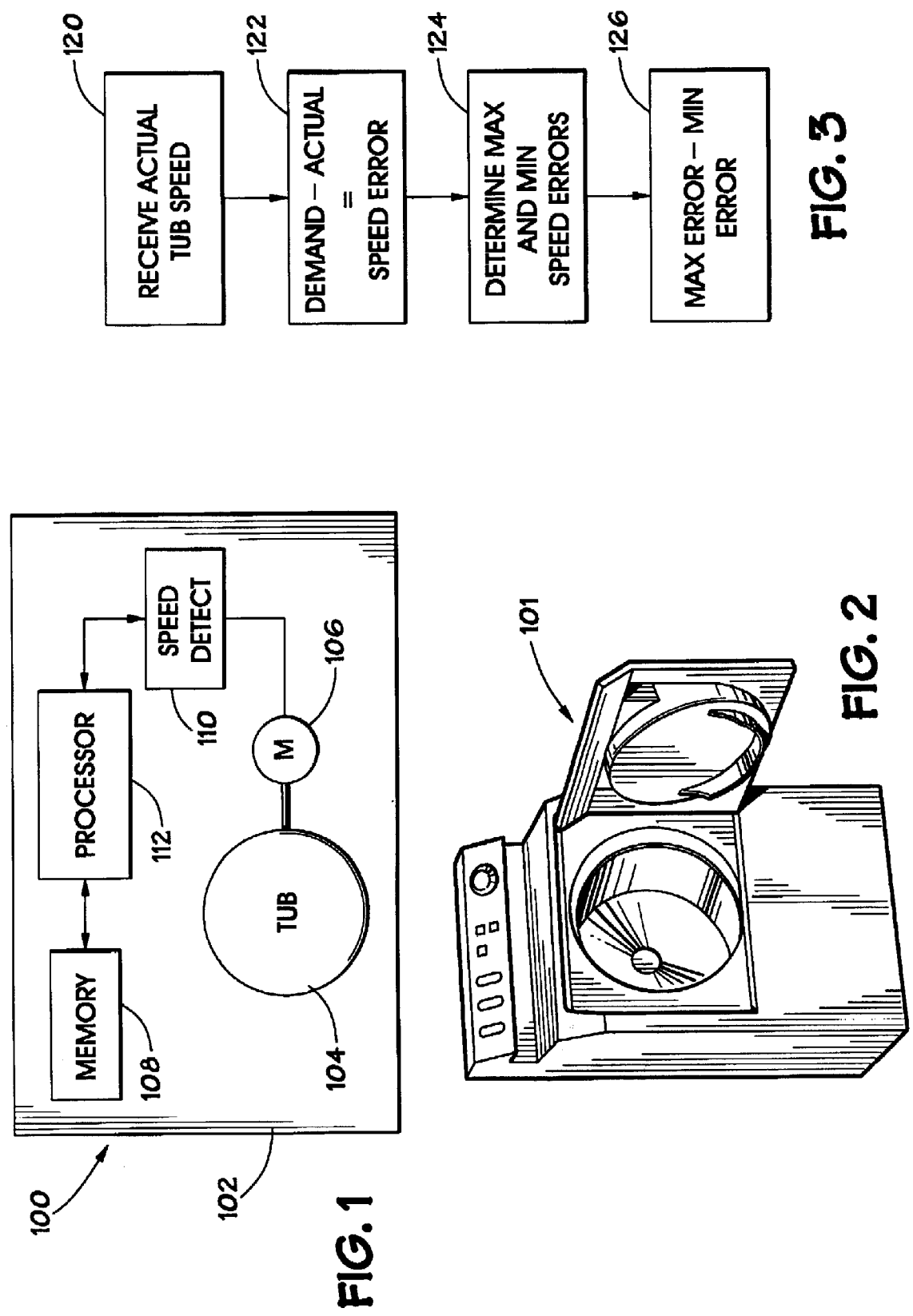

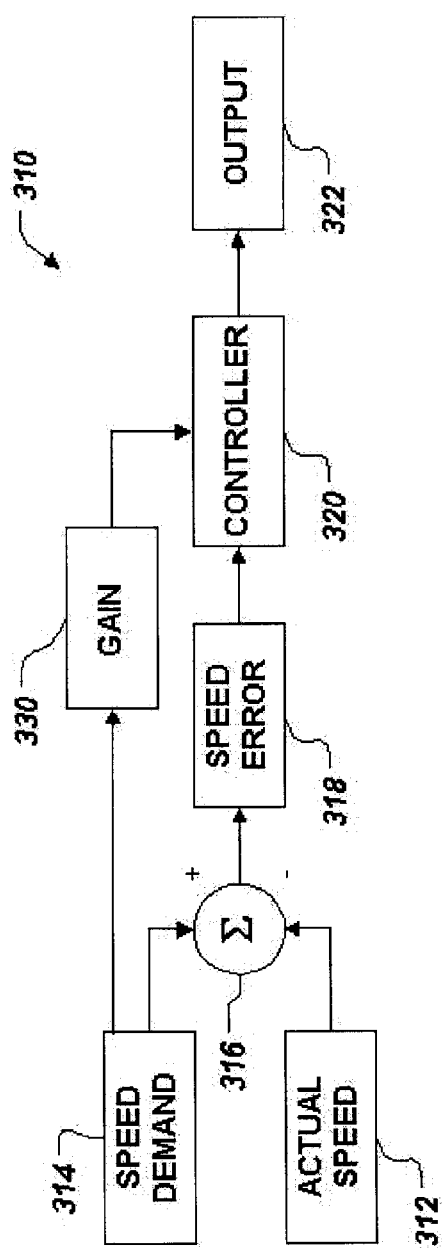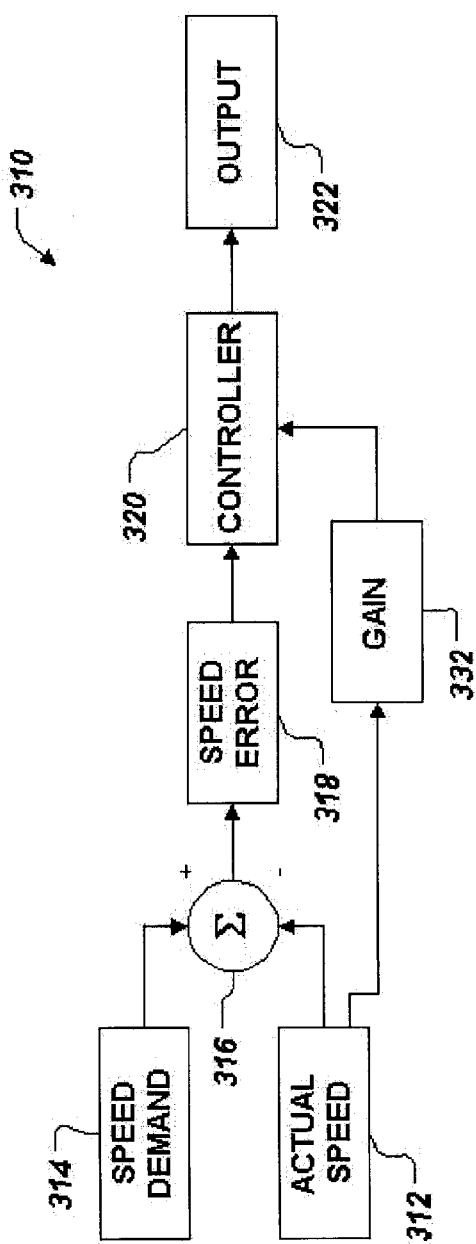

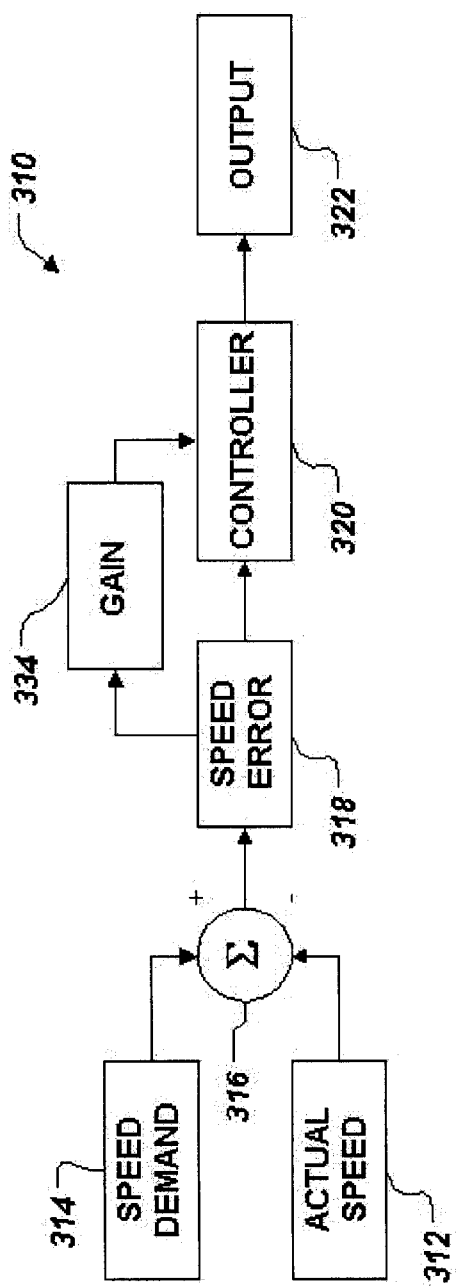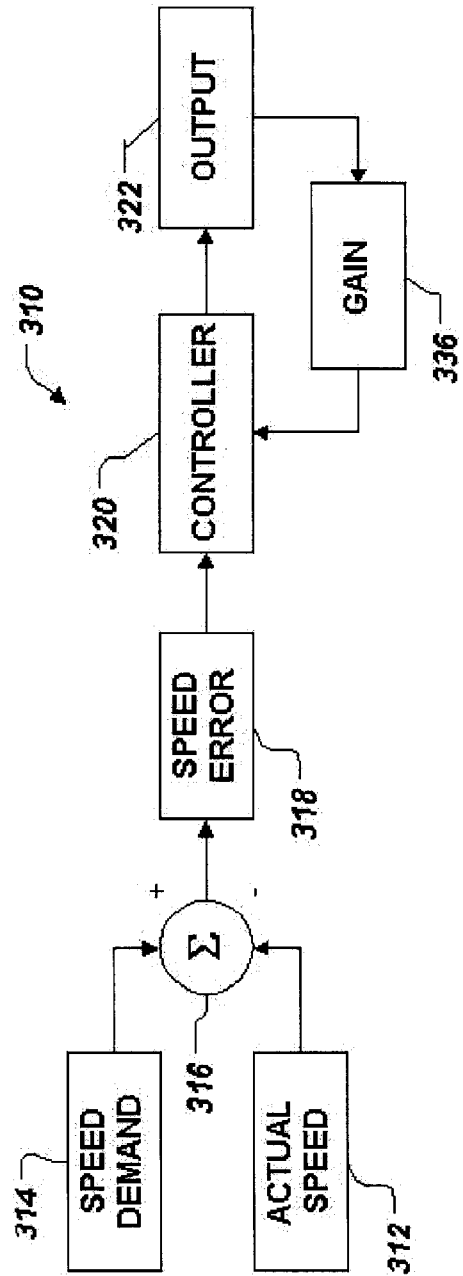

WASHING MACHINE TUB SPEED CONTROL METHOD AND APPARATUS

CROSS-REFERENCE TO RELATED APPLICATIONS

This application is a continuation-in-part of co-pending U.S. patent application Ser. No. 09/197,272, filed Nov. 20, 1998, now U.S. Pat. No. 6,282,965 the entire specification of which is hereby incorporated by reference.

BACKGROUND OF THE INVENTION

1. Field of the Invention

This invention relates generally to clothes washing machines, and more particularly, to a method and system for controlling rotation of a washing machine tub.

2. Description of Related Art

Residential and commercial clothes washing machines are well known. A generally cylindrical tub or basket for holding the clothing and other articles to be washed is rotatably mounted within a cabinet. Typically, an electric motor drives the tub. During a wash cycle, water and detergent or soap are forced through the clothes to wash them. The detergent is rinsed from the clothes, then, during one or more spin cycles, the water is extracted from the clothes by spinning the tub.

One way of categorizing washing machines is by the orientation of the washing machine tub. Conventional, vertical-axis washing machines have the tub or basket situated to spin about a vertical axis. Articles to be washed are loaded into the tub through a door, which is usually situated on the top of the washing machine. A vertical-axis washing machine tub includes an agitator situated therein, which cleans clothes by pushing and pulling them down into the water. A motor typically drives the agitator, in addition to spinning the vertically-oriented tub during spin cycles. The motor usually operates at a constant speed, and a series of gears or belts are configured to drive the proper component at the proper time during each washing machine cycle.

Horizontal-axis washing machines, having the tub oriented to spin about an essentially horizontal axis, do not include an agitator, and a variable-speed motor drives the tub. During wash cycles, the tub of the horizontal-axis washing machines rotates at a relatively low speed. The rotation speed of the tub is such that clothes are lifted up out of the water, using baffles distributed about the tub, then dropped back into the water as the tub revolves.

Both vertical and horizontal-axis washing machines extract water from clothes by spinning the tub, such that centrifugal force extracts water from the clothes. It is desirable to spin the tub at a high speed and extract the maximum amount of water from the clothes in the shortest possible time, thus saving time and energy. The distribution of the clothes about the periphery of the tub affects the washing machine's ability to spin the tub at a high speed.

Vertical-axis washing machines are especially susceptible to imbalance problems. Several factors contribute to this predicament. For instance, when a wash or rinse cycle completes and the water is drained from the tub, the clothes are gathered at the bottom of the tub, not distributed about the entire tub. In conventional washing machines, the tub typically is not perfectly cylindrical; but rather, includes a draft. When the tub spins, the clothes will "creep" up the sides of the tub. However, since a constant speed motor typically drives the vertically-oriented tub, the motor quickly ramps the tub up to the full spin speed. There is little chance for the clothes to distribute about the periphery of the tub, so they creep up the tub's sides in an unbalanced fashion.

The unbalanced, spinning tub vibrates within the cabinet. In conventional vertical-axis washing machines, if the vibration is too severe, the tub will trip a switch mounted inside the cabinet, stopping the tub's rotation and activating a tub-imbalance alarm. A user then manually redistributes the wet clothes within the tub, and restarts the spin cycle.

Horizontal-axis washing machines typically are less vulnerable to tub imbalances. As discussed above, the tub in a horizontal-axis machine is driven by a variable speed motor. This allows the inclusion of a "distribution" cycle, wherein the tub is rotated faster than the rotation speed of a wash cycle, but slower than in a spin cycle. The tub rotation speed is gradually increased, until the clothes begin to "stick" to the sides of the tub due to centrifugal force. The slower rotation speed allows the clothes to more evenly distribute about the sides of the tub. Once the clothes have been distributed about the tub, the speed is increased to a full spin speed to extract the water from the clothes.

Even though horizontal-axis washing machines may be less prone to tub imbalances, they are not immune to tub imbalance problems. If the clothes do not evenly distribute during the distribution cycle, the unbalanced load within the tub will cause unwanted vibrations as the tub rotates. Rather than applying all of the motor's power to spinning the tub at the highest possible speed, power is wasted in tub movement and cabinet vibrations.

Controlling the speed of the rotating tub is also important to optimize washing machine performance. In horizontal-axis washing machines, the tub must be rotated at the proper speed in order to carry out the functions of the various machine cycles and keep machine noise at a minimum. Further, it is desirable to change the rotation speed of the various cycles in a controlled manner. However, the load contained within a washing machine tub can vary widely, due to different wash load sizes, the type items being washed, the amount of water contained within the tub, etc. Thus, the torque required to achieve a desired tub rotation speed also varies widely, complicating speed control of the rotating tub.

The present invention addresses these, and other, shortcomings associated with the prior art.

SUMMARY OF THE INVENTION

In one aspect of the invention, systems and methods of controlling the rotation speed of a washing machine tub are disclosed. The novel control systems and methods of the present invention employ an adaptive gain control technique, wherein controller gain factors are adjusted as a function of one or more operating parameters of the washing machine system.

One method includes receiving an indication of the actual tub rotation speed and comparing the actual tub rotation speed to a set point speed to calculate a speed error. In response to the speed error, at least one gain factor is determined and applied to the speed error to calculate a correction factor. The gain factor may include one or more of a proportional, integral and/or derivative gain factor. In certain embodiments of the invention, a torque demand factor is determined based on the speed error and the gain factor is determined in response to the torque demand factor. Further, the average torque demand may be calculated, and the gain factor is determined based on the average torque demand factor.

The tub rotation speed may be changed in a controlled manner. In one implementation, a demand gap value is determined by comparing the difference between a demanded rotation speed and the set point speed. The demand gap value is compared to a predetermined maximum speed change value, and the set point speed is increased by the lesser of the demand gap value and the maximum speed change value.

In accordance with other aspects of the invention, the size of the load in the washing machine tub is determined, and the gain factor is adjusted based on the load size. The desired tub rotation speed may also be varied based on the load size. Several parameters may be considered for a determination of load size, including the average system torque demand.

Moreover, the adaptive gain control techniques may be selectively employed. In an exemplary embodiment of the invention, if the washing machine is operating in a spin cycle, the gain factor comprises a predetermined gain factor, and if the washing machine is operating in a cycle other than a spin cycle, the gain factor is determined in response to system parameters such as the speed error.

In still other aspects of the invention, a system for implementing the disclosed control methods includes a speed detection device operable to output an indication of the tub rotation speed, a controller coupled to the speed detection device to receive the indication of the tub rotation speed, and a memory accessible by the controller and storing a speed demand value. The controller is operable to compare the tub rotation speed to the speed demand to calculate a speed error and apply a gain factor to the speed error to calculate a correction factor. The gain factor is determined based on system parameters, including the size of a load contained within the washing machine tub, the tub rotation speed, the speed error, the speed demand, etc.

In accordance with further aspects of the invention, a clothes washing system includes a cabinet, a tub rotatably mounted within the cabinet, a motor operably coupled to the tub for rotating the tub within the cabinet and a speed detection device operable to output an indication of the tub rotation speed. A controller is coupled to the speed detection device to receive the indication of the tub rotation speed, and a memory storing a speed demand value is accessible by the controller. The controller is operable to compare the tub rotation speed to the speed demand to calculate a speed error and apply at least one gain factor to the speed error to calculate a correction factor. The gain factor is determined based on an indication of a load contained within the washing machine tub and/or on other system parameters.

BRIEF DESCRIPTION OF THE DRAWINGS

Other objects and advantages of the invention will become apparent upon reading the following detailed description and upon reference to the drawings in which:

FIG. 1 is a block diagram, schematically illustrating a system for detecting a washing machine tub imbalance condition in accordance with an embodiment of the present invention;

FIG. 2 is a perspective view of a horizontal-axis washing machine in accordance with an exemplary embodiment of the present invention;

FIG. 3 is a flow diagram, illustrating a method for detecting a washing machine tub imbalance in accordance with the present invention;

FIGS. 9A–D are block diagrams illustrating simplified speed control loops in accordance with exemplary embodiments of the invention;

Figure 4:
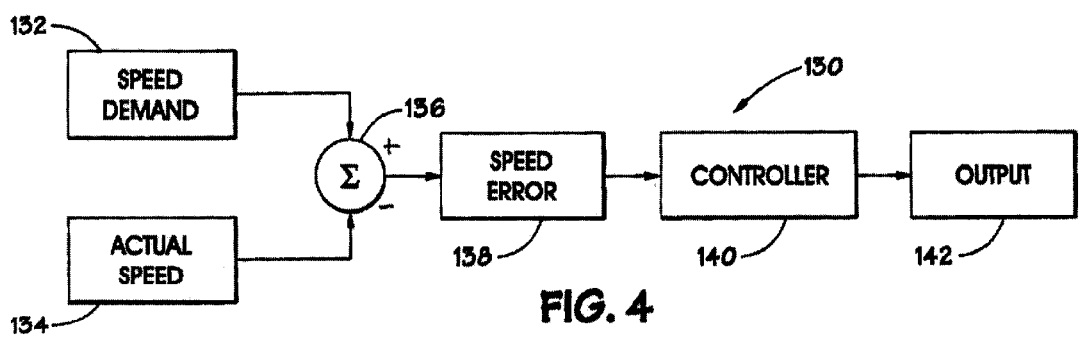
FIG. 4 is a block diagram illustrating a speed control loop in accordance with an embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 is a block diagram, schematically illustrating a washing machine 100 in accordance with an embodiment of the present invention. The washing machine 100 includes a cabinet 102, in which a tub 104 is rotatably mounted. In one embodiment of the invention, the washing machine 100 is a horizontal-axis washing machine. In other words, the tub 104 is configured to rotate about a substantially horizontal axis within the cabinet 102. FIG. 2 illustrates a horizontal-axis washing machine 101 in accordance with a specific embodiment of the invention.

Referring back to FIG. 1, a motor 106 is operably connected to the tub 104 to drive the tub 104, for example, via a belt. The machine 100 further includes a memory 108 that stores a rotation speed demand value. A speed detection device 110 is coupled to the motor 106 to ascertain the actual speed of the motor 106, and hence, the rotation speed of the tub 104. Alternatively, the speed detection device 110 may be coupled directly to the tub 104 to detect its rotation speed. In yet other embodiments, rotation speed of the motor 106 and thus, the tub 104 is determined without the use of sensors by monitoring electrical and magnetic parameters of the motor 106. An example of such sensorless operation is described in U.S. Pat. No. 5,701,064, assigned to the assignee of the present application, which is incorporated by reference in its entirety.

A processor 112 is programmed to detect an imbalance condition of the rotating tub 104, based at least in part upon the difference between the actual rotation speed of the tub 104 (as detected by the device 110) and the speed demand stored in the memory 108. In an embodiment of the invention, the processor 112 is programmed according to the method illustrated in FIG. 3 to determine the out of balance condition of the tub 104. Referring to the flow diagram of FIG. 3, an indication of the actual rotation speed of the tub 104 is received in block 120. In block 122, a speed error is calculated by comparing the actual rotation speed, as determined in block 120, to the speed demand stored in the memory 108. In other words, the actual rotation speed is subtracted from the speed demand to obtain the speed error.

In block 124, the maximum and minimum speed errors are determined. In particular embodiments, this is done for each revolution of the tub 104. In block 126, the difference between the maximum and minimum speed errors is calculated to determine the out of balance condition. The difference between the maximum and minimum speed errors calculated in block 126 provides an indication of the degree that the tub 104 is out of balance; the greater the difference between the maximum and minimum speed errors, the greater the imbalance of the tub 104.

In an exemplary embodiment of the invention, the washing machine 100 includes a controller that controls the rotation speed of the tub 104. FIG. 4 illustrates a speed control loop 130 used in an embodiment of the invention. The speed demand 132, as stored in the memory 108, is compared to the actual rotation speed 134, as indicated by the device 110, at a summation point 136 to produce a speed error 138. The speed error 138 is input to a controller 140, which produces an output 142 that is applied to the motor 106 to correct the speed error 138. The controller 140 is effective in keeping the speed error small. Thus, the minimum and maximum output 142 of the controller 140 may be used to detect an imbalance condition.

Figure 5:
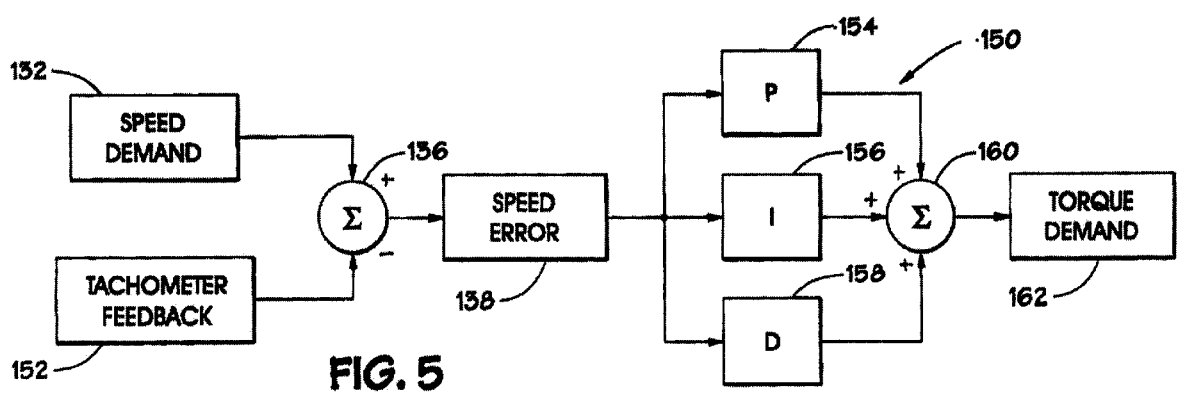
FIG. 5 is a specific embodiment of the speed control loop of FIG. 4.

FIG. 5 illustrates a proportional-integral-derivative (PID) speed control loop 150, which is employed in a specific embodiment of the invention. The speed control loop 150 is implemented in software via the processor 112, which, in this exemplary embodiment, comprises a microcontroller. A Motorola model MC68HC05P9 microcontroller is a suitable processor. The Motorola model MC68HC05P9 microcontroller includes on-chip memory; therefore, the memory 108 is contained within the processor 112.

In an embodiment employing the PID speed control loop 150 shown in FIG. 5, the motor 106 comprises a switched reluctance motor, as is known in the art. A reluctance motor is an electric machine in which torque is produced by the tendency of a movable part to move to a position where the inductance of an energized winding is maximized (i.e., the reluctance is minimized). The switched reluctance motor is generally constructed without conductive windings or permanent magnets on the rotating part (called the rotor) and includes electronically-switched windings carrying unidirectional currents on the stationary part (called the stator). Commonly, pairs of diametrically opposed stator poles may be connected in series or parallel to form one phase of a potentially multi-phase switched reluctance motor.

Motoring torque is developed by applying voltage to each of the phase windings in a predetermined sequence that is synchronized with the angular position of the rotor so that a magnetic force of attraction results between poles of the rotor and stator as they approach each other. Thus, in a switched reluctance machine, a rotor position detector is typically employed to supply signals corresponding to the angular position of the rotor, such that the phase windings may be properly energized as a function of the rotor position.

One or more phase windings are energized when the rotor is at a first angular position, the "turn-on angle," and then de-energized at a second angular position, the "turn-off angle." The torque of a switched reluctance motor can be controlled by varying the magnitude of the current in the energized phase windings. This current control can be achieved, for example, by chopping the current using a current reference with phase current feedback or by pulse width modulated voltage control.

The rotor position detector may take many forms. In some systems, the rotor position detector can comprise a rotor position transducer that provides output signals that change state each time the rotor rotates to a position where a different switching arrangement of the devices in the power converter is required. In other systems, the rotor position detector can comprise a relative position encoder that provides a pulse (or similar signal) each time the rotor rotates through a preselected angle.

In an embodiment of the present invention employing a switched reluctance motor, the output of the rotor position detector functions as a tachometer that generates a speed feedback signal 152, indicating the motor 106 speed, and thus, the rotation speed of the tub 104. In an exemplary speed detection system, the rotor position sensor for the motor 106 provides 48 pulses per revolution of the motor 106. The rotor position sensor's 48 pulses per revolution are divided down by the controller chip (not shown) for the motor 106 to eight pulses per revolution. These eight pulses are provided to the processor 112. The washing machine employs a belt drive for rotating the tub 104, with the system having a 12:1 belt ratio. Thus, there are 96 tachometer pulses per revolution of the tub 104 provided to the processor 112. The present invention, however, is not limited to a speed detection such as this. A person having ordinary skill in the art could determine actual tub rotation speed using approaches other than a tachometer. For example, in another exemplary embodiment employing a sensorless switched reluctance motor, eight pulses per revolution are provided based on motor speed determined by examining motor parameters. In embodiments using an induction motor to drive the tub 104, slip may be examined to determine speed.

The tachometer feedback 152, indicating actual speed, is compared to the speed demand 132 at the summation point 136 to produce the speed error 138. The speed error 138 is applied to the controller's proportional 154, integral 156 and derivative 158 modes, and the PID action is summed at a summation point 160. The output of the controller is a torque demand 162 required to correct the speed error 138. The controller 140 is effective at keeping the speed error 138 signal small. The controller 140 output is such as to counteract the tendency of the speed to change. Then the difference between the minimum and maximum of the controller 140 output indicates the imbalance directly.

In other embodiments, each of the proportional 154, integral 156 and derivative 158 control modes are not utilized in the speed control loop 150. For instance, it would be a routine undertaking for one skilled in the art having the benefit of this disclosure to implement the invention using only proportional and integral control action.

Figure 6:
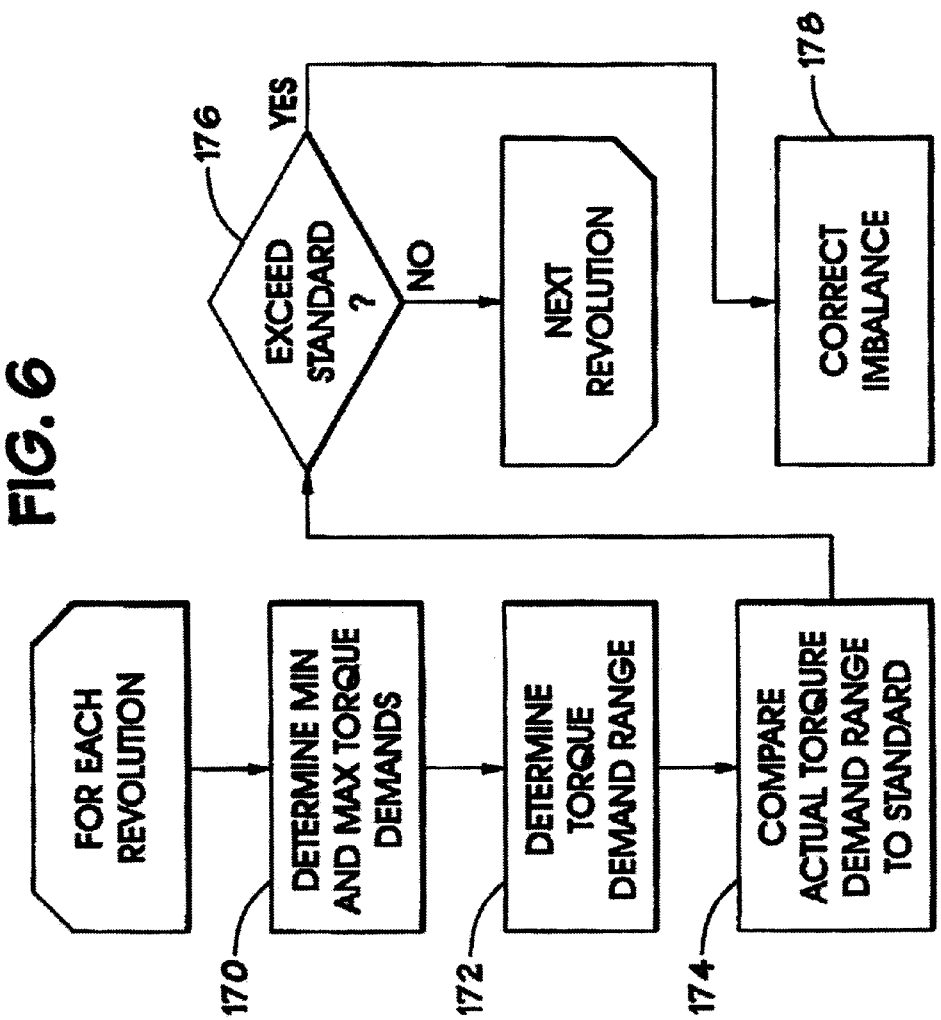
FIG. 6 is a flow diagram illustrating an embodiment of a method in accordance with the present invention.

FIG. 6 illustrates an exemplary method, used with an embodiment employing a speed control loop as shown in FIG. 5. During each revolution of the washing machine tub 104, each torque demand signal 162 is captured and compared to determine the minimum and maximum torque demands 162 in block 170. The range of torque demand signals 162 for each revolution of the tub 104 is determined in block 172 by subtracting the minimum torque demand 162 from the maximum torque demand 162. In alternative embodiments, the minimum and maximum torque demand are not determined during each tub revolution, but rather, during some preselected revolutions, for example, every-other revolution, or every half revolution. In still further embodiments, the minimum and maximum torque demand may be determined periodically, for example, at predetermined time intervals.

The memory 108 contains a predetermined standard torque demand range, to which the difference between the minimum and maximum torque demand is compared to the standard torque demand range in block 174 during distribution. In decision block 176, the processor 112 determines whether the actual range exceeds the standard. If the actual range is within the standard, operation continues. If the actual range exceeds the standard, corrective action may then be taken in block 178. For example, if the actual torque demand range exceeds the standard, the clothes can be retumbled, then the distribution cycle may be restarted. This often corrects the imbalance. Alternatively, the distribution ramp may be modified to better balance the tub 104.

Moreover, since the minimum and maximum torque demands are determined at a plurality of angular locations based on the tachometer feed back 152, the position of the tub 104 imbalance may be determined. For instance, information relating to the angular position of the minimum and maximum torque demands and the torque demand range, for a given load, may be empirically correlated to angular positions of load imbalances. These relationships may be provided in a look-up table stored in the memory 108 and accessed by the processor 112 to implement corrective action at the specific imbalance location. This may be necessary, for example, if the tub as produced is not balanced. It should be noted that using the output 142 or torque demand 162 to determine imbalance may cause a phase shift in the estimated position of an imbalance. One skilled in the art, however, could compensate for this phase shift via knowledge of the controller time constants and other controller parameters.

As discussed in the Background of the Invention section herein above, washing machines typically include a variety of operation cycles. Washing machines—particularly horizontal-axis machines—include one or more wash cycles, distribution cycles and spin cycles. The above described method of detecting imbalance may be employed during any washing machine cycle, though tub imbalance is rarely a problem during wash cycles, which, in a horizontal-axis machine, use a tub rotation speed of about 50 rpm to tumble the clothes in and out of the water. The method described in conjunction with FIG. 3 and FIG. 5 is particularly well suited for distribution cycles, which typically operate at a tub rotation speed of about 55–110 rpm (clothes will begin to "stick" to the sides of the tub 104 at one G of centrifugal force, or about 60 rpm).

In comparison, the minimum rotation speed that is normally considered a "spin cycle" speed is about 250 rpm. In a particular embodiment of the invention, a tub rotation speed of about 350–450 is considered a "low" spin speed, a tub rotation speed of about 650–850 is considered a "medium" spin speed, and a tub rotation speed of about 1,000 rpm is considered a "high" spin speed. As discussed above, it is desirable to rotate the tub 104 at a high speed to extract the maximum amount of water from the clothes. At the high tub rotation speeds of a spin cycle, it may be difficult to implement the method illustrated in FIG. 3 or FIG. 5, depending on the processing speed available.

Figure 7:
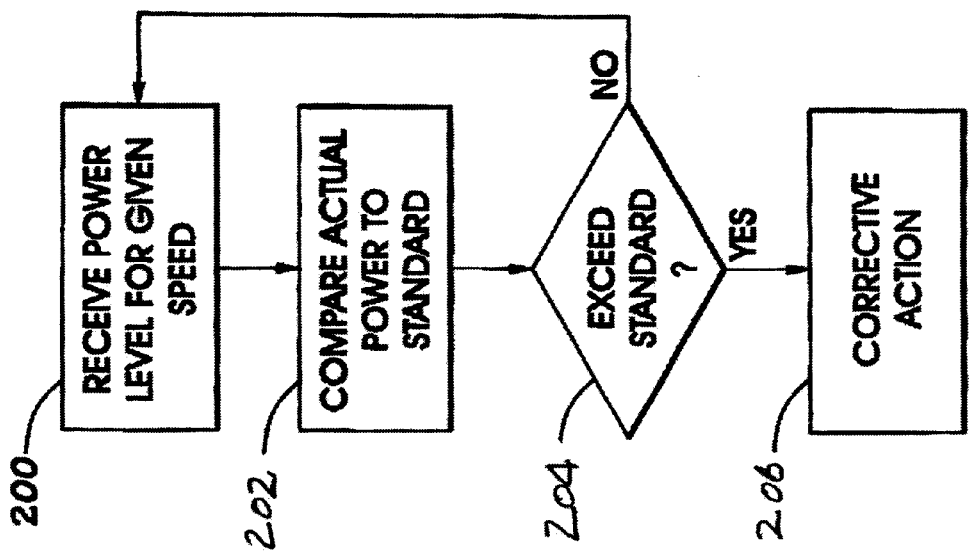
FIG. 7 is a flow diagram illustrating an alternative method in accordance with the invention for detecting and correcting a washing machine tub imbalance condition.

FIG. 7 illustrates another method in accordance with the present invention for detecting washing machine tub imbalance. The embodiment illustrated in FIG. 7 is especially suited for use with the high rotation speeds of a spin cycle, though the method may be applied to other cycles, such as a wash cycle. In block 200, an indication of the power required to achieve a given tub rotation speed is received. In a particular embodiment, the power level indication is obtained during the tub's 104 acceleration. In block 202, the power level received in block 200 is compared to a predetermined "normal" power level or power level range required for achieving the demanded speed with a given load. As shown in decision block 204, if the actual power level exceeds the standard power level for the given speed demand, corrective action is taken in block 206. If the actual power does not exceed the standard power level, the system continues to operate.

Figure 8:
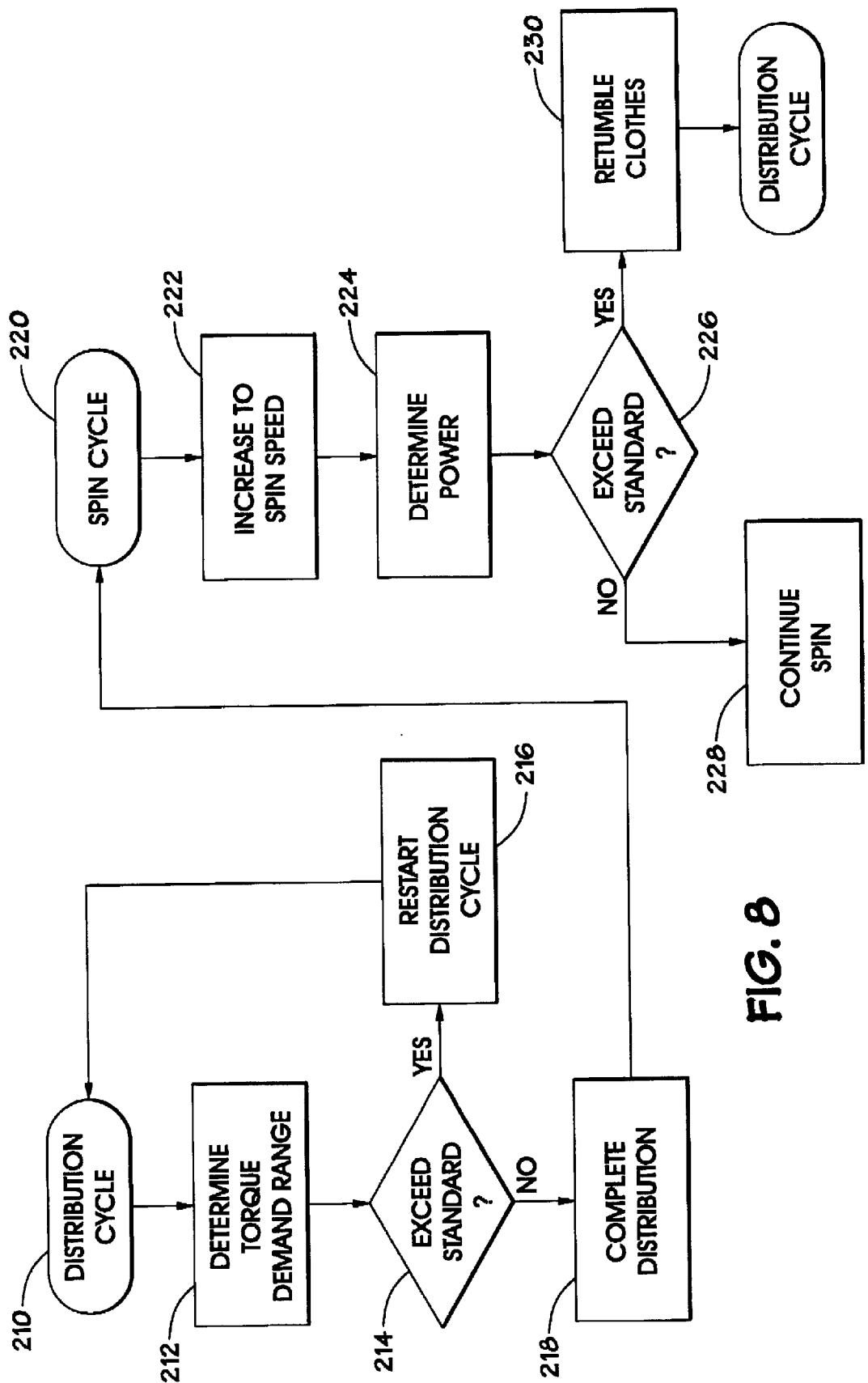
FIG. 8 is a flow diagram illustrating a method of controlling a washing machine in accordance with the present invention.

FIG. 8 illustrates a method for controlling a washing machine in accordance with an embodiment of the invention. In this exemplary embodiment, the washing machine is a horizontal-axis machine that includes at least first and second cycles, which may comprise distribution and spin cycles, respectively. For distribution cycles, wherein the tub rotation speed is gradually increased until the clothes "stick" to the sides of the tub, a process essentially as illustrated in FIG. 6 is used to detect a tub imbalance condition. For spin cycles, wherein the tub is rotated at a high speed to extract water from the clothes, a process along the lines illustrated in FIG. 7 is used.

In block 210, a distribution cycle is initiated. The minimum torque demand 162, as output by the PID control loop 150, is subtracted from the maximum torque demand to determine the torque demand range in block 212. In decision block 214, the torque demand range is compared to a predetermined standard torque demand, and if the torque demand range exceeds the standard, corrective action is taken. In one embodiment, the clothes are retumbled and the distribution cycle is then restarted, illustrated in block 216. If the torque demand range does not exceed the standard, the distribution cycle continues until the clothes are distributed about the sides of the tub 104, illustrated in block 218.

When the clothes are properly distributed, the spin cycle begins (block 220) by increasing the rotation speed of the tub 104 to the desired spin speed in block 222. In block 224, the average torque demand 162 is monitored at various speeds to determine power. Power is monitored in order to determine if excess power is required for a given spin speed with a given load. In decision block 226, the power for the given speed is compared to a standard, or "normal" power level for the given speed. If the actual power exceeds the standard, power is being wasted in tub 104 vibration, rather than being provided to the load. Thus, if the actual power does not exceed the standard, the spin cycle continues in block 228. If the actual power exceeds the standard in decision block 226, corrective action is taken. In this exemplary embodiment, the clothes are retumbled at a wash speed in block 230, and the distribution cycle is repeated. Other corrective actions may be used in alternative embodiments; for instance, reducing the spin speed.

Since some embodiments in accordance with the invention disclosed herein use the output of the controller 140, the imbalance condition may be determined at any point during a particular washing machine cycle. It is not necessary for the tub 104 to be rotating "at speed"—the desired distribution or spin cycle speed—to implement the methods of the present invention. Rather, an imbalance condition may be detected at any point after the tub 104 begins rotating. Still further, the actual speed may be compared to any preselected speed demands 132. This allows the imbalance condition to be detected and corrected as soon as possible in the cycle, reducing wasted energy and other problems associated with imbalance conditions.

In accordance with further aspects of the invention, novel washing machine speed control methods and associated systems are provided. In a typical speed control loop, for example, a PID speed control loop, proportional, integral and derivative gain factors are applied to a calculated speed error to calculate a correction factor, which is applied to bring the controlled device to the desired speed. In accordance with the present invention, the gain factors are adjusted based on various system parameters to improve system performance. For instance, gains may be adjusted based on the washing machine load. At greater wash loads, the system gains are increased resulting in smoother starting with reduced overshoot from a small load to a full load, or as the tub fills with water. The gain factors may be adjusted in response to any of several factors, including the actual or desired tub rotation speed, speed error, average torque demand, average power, etc.

FIGS. 9A–D illustrate variations of a simplified speed control loop 310, which may be implemented via an appropriately programmed processor 112. Referring to FIGS. 9A–D in conjunction with FIG. 1, the speed detection device 110, which may comprise a tachometer, provides an indication of the actual tub 104 rotation speed 312. The actual speed 312 is compared to a set point, or speed demand 314 at a summing junction 316 to calculate a speed error 318. The speed error 318 is received by a controller 320, which applies the speed error to one or more gain factors to produce an output 322, which is then applied to the motor 106 to correct the speed error 318.

In FIG. 9A, the gain factors 330 are determined in response to the speed demand 314, and in FIG. 9B, the gains 332 are adjusted in response to the actual tub rotation speed is 312. In FIG. 9C, the gains 334 are based on the speed error 318, and gain factors 336 are determined based on the controller output 322 as shown in FIG. 9D. In systems employing a speed detection device 110 that provides a digital speed indication, filter constants are similarly adjusted. Linear equations may be used to determine gains and filter constants based on measured system parameters, or an array or matrix may be stored in the memory 108, and employed using set values or an interpolation technique for values between set values. As washing machines typically operate at a distinct set of speeds, stepping between gain factors would also result in satisfactory system operation.

Figure 10:
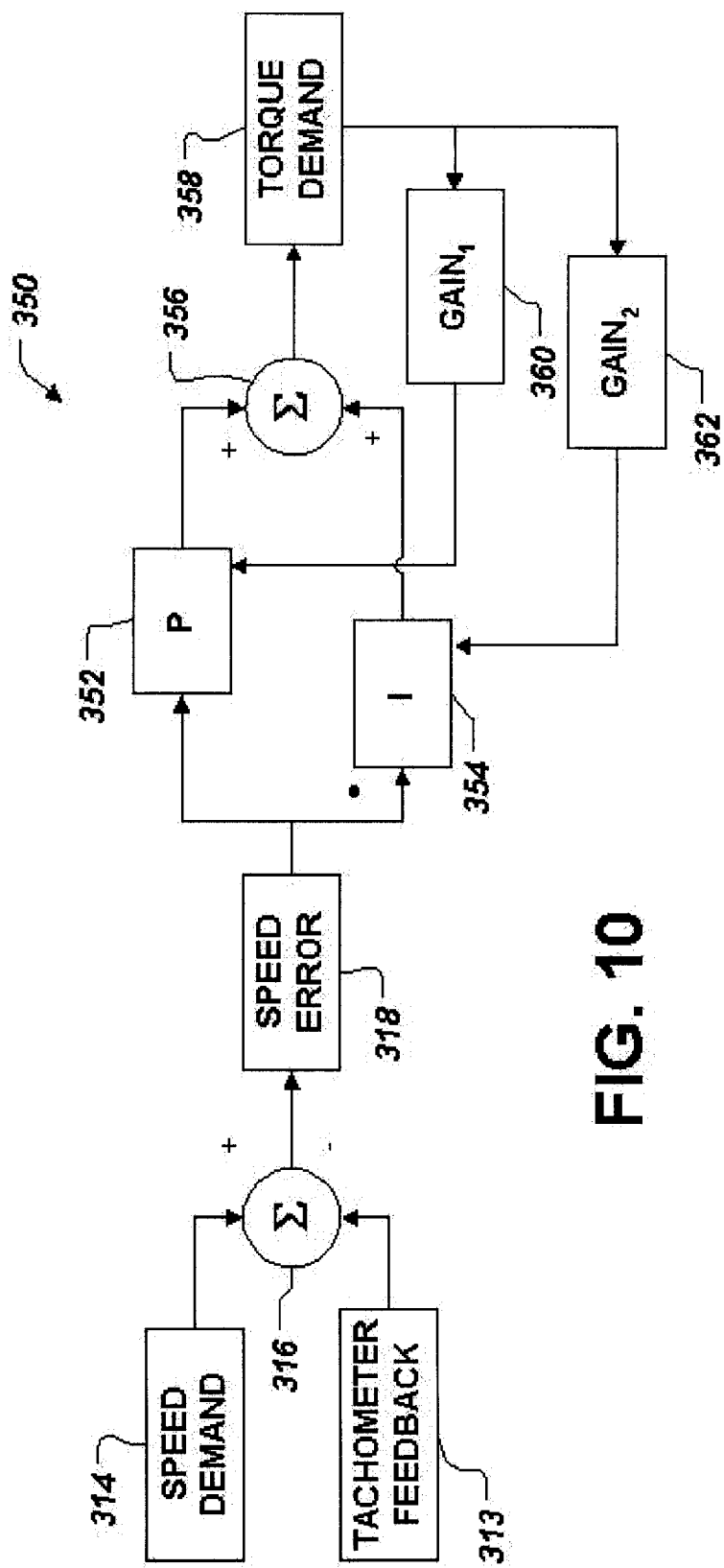
FIG. 10 is a block diagram illustrating a speed control loop in accordance with a specific embodiment of the invention.

FIG. 10 illustrates an exemplary PI speed control loop 350 employing the adaptive gain technique in accordance with the present invention. The exemplary speed controller illustrated in FIG. 10 is similar to that shown in FIG. 5, though the particular embodiment of FIG. 10 omits the derivative control mode. The controller 350 includes a tachometer 313 that provides a digital signal representing the actual tub speed. As disclosed in conjunction with FIG. 5, the tachometer in one embodiment provides 96 pulses per revolution of the tub 104. In certain implementations, the pulses per revolution provided is varied based on the rotation speed. For instance, at low speeds, such as during a distribution or wash cycle, the number of pulses is increased to improve loop response. At higher speeds, the number of pulses is reduced as the higher number of interrupts would limit computation time.

The tachometer feedback 313, indicating actual speed, is compared to the speed demand 314 at the summation point 316 to produce a speed error 318. The speed error 318 is applied to the controller's proportional 352 and integral 354 modes, and the PI action is summed at a summation point 356. The output of the controller 350 is a torque demand 358 required to correct the speed error 318.

The torque demand 358 is filtered with a long time constant (30 sec. in one embodiment) to determine the average torque demand, and the system's proportional and integral gains 360, 362 are adjusted as a function of average torque requirements. Thus, for low loads, low overall system gains are used and the system performance is more stable and quiet. Start-up is also improved as lower gains (at lower loads) produce smooth starting with no overshoot—the system is properly damped. At greater wash loads, system gains are increased. Smoother starting is obtained at higher loads with increased gains. Starting is also improved as higher average torque is provided to start the heavier load. The system response is again damped with reduced overshoot and improved performance during higher wash loads. Typically, the gains 360, 362 are initially set low, and as the tub fills with water, the load increases and the gains are correspondingly increased.

The tub rotation speed may also be varied in response to the size of the wash load. For example, a small wash load will properly tumble at a slower speed than is required for a large load. Thus, the controller may be programmed to vary the speed demand, or set point speed in response to the size of the load contained within the tub.

Figure 11:
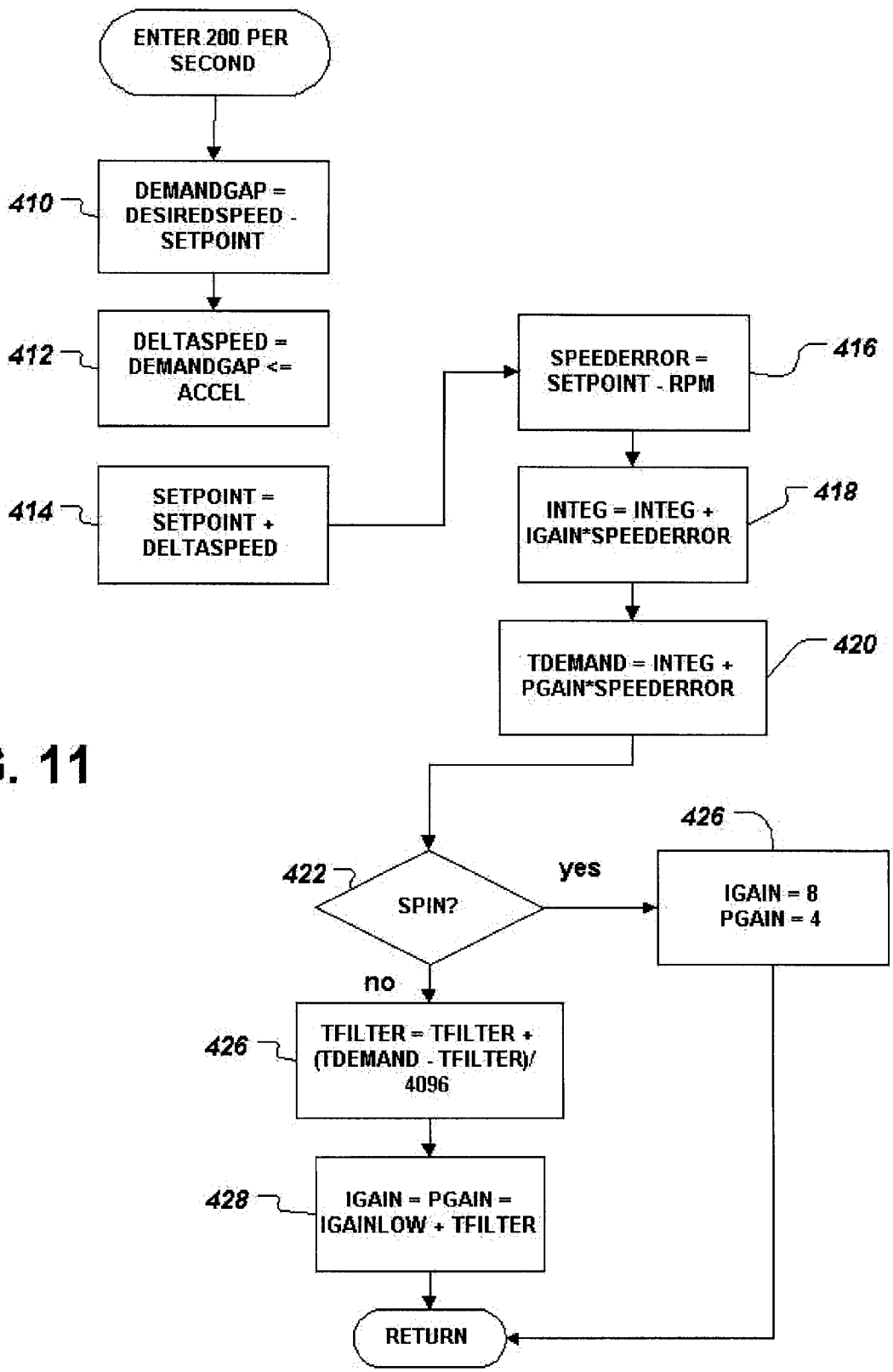
FIG. 11 is a flow diagram illustrating an implementation of an adaptive gain control system in accordance with the present invention.

FIG. 11 is a flow diagram illustrating an exemplary implementation of an adaptive gain system in accordance with the invention used with a horizontal axis washing machine having a tub driven by a switched reluctance motor. The illustrated process is executed repeatedly at regular intervals, for example, every 5 milliseconds. In block 410, a DEMANDGAP value is determined by subtracting a SETPOINT value from the DESIREDSPEED value. Initially, the SETPOINT value is set at zero. In block 412, a predetermined maximum speed change value, ACCEL, is compared to the DEMANDGAP determined in block 410. A DELTASPEED value is then set at the lessor of DEMANDGAP and ACCEL. The SETPOINT value is then increased by DELTASPEED in block 414. Thus, the SETPOINT value is ramped up in fixed increments no greater than the predetermined maximum SETPOINT change, ACCEL.

In block 416, the SPEEDERROR is determined by subtracting the actual tub rotation speed, RPM, from SETPOINT. The integral term, INTEG, is adjusted by the integral gain factor IGAIN multiplied by SPEEDERROR in block 418. In certain implementations, the derivative gain is also applied. In block 420, the output torque demand, TDEMAND, is determined by summing the proportional and integral (and derivative, if used) components. TDEMAND may comprise a duty cycle value for systems applying phase energization current to motor windings using pulse-width modulation voltage control.

If the washing machine is operating in a spin cycle as determined in decision block 422, fixed gain factors are used. In the illustrated example, IGAIN and PGAIN values are set at 8 and 4, respectively, in block 424. In wash modes, the gain factors are adaptive. In block 426, TDEMAND is low-pass filtered, resulting in TFILTER. Finally, in block 428, the proportional and integral gain factors, PGAIN and IGAIN, are set at a minimum gain constant IGAINLOW plus the filtered torque demand, TFILTER.

In certain implementations such as that illustrated in FIG. 11, the adaptive gain system is disabled at predetermined times. For example, during a spin cycle, rotation speed is typically greater than 250 rpm. At high speeds, torque is high even with a small load, hence the variability of the torque demanded is less. During wash cycles, the gains may initially be set for a nominal or peak load. The adaptive gain system is then used to reduce the gains for low loads. Conversely, the gains may be set low when a wash cycle is initiated and no water is in the tub, then increased as water is added to the tub.

It will be appreciated by those of ordinary skill in the art having the benefit of this disclosure that the embodiment illustrated above is capable of numerous variations without departing from the scope and spirit of the invention. It is fully intended that the invention for which a patent is sought encompasses within its scope all such variations without being limited to the specific embodiment disclosed above. Accordingly, the exclusive rights sought to be patented are as described in the claims below.

What is claimed is:

1. A method of controlling the rotation speed of a washing machine tub, comprising:
    receiving an indication of the actual tub rotation speed;
    comparing the actual tub rotation speed to a set point speed to calculate a speed error;
    determining at least one gain factor in response to the speed error; and
    applying the at least one gain factor to the speed error to calculate a correction factor.

2. The method of claim 1, wherein determining at least one gain factor comprises determining at least one of a proportional, integral and derivative gain factor.

3. The method of claim 1, further comprising calculating a torque demand factor based on the speed error; wherein determining at least one gain factor includes determining a gain factor in response to the torque demand factor.

4. The method of claim 3, further comprising calculating the average torque demand factor; wherein determining at least one gain factor includes determining a gain factor in response to the average torque demand factor.

5. The method of claim 1, further comprising:
    determining a demand gap value by comparing the difference between a demanded rotation speed and the set point speed;
    comparing the demand gap value to a predetermined maximum speed change value; and
    increasing the set point speed by the lesser of the demand gap value and the maximum speed change value.

6. The method of claim 1, wherein determining at least one gain factor includes:
    if the washing machine is operating in a spin cycle, the gain factor comprises a predetermined gain factor; and
    if the washing machine is operating in a cycle other than a spin cycle, determining a gain factor in response to the speed error.

7. The method of claim 1, wherein receiving the indication of the actual tub rotation speed includes:
    receiving a first number of pulses per rotation of the tub; and
    receiving a second number of pulses per rotation speed in response to a change in the tub rotation speed.

8. A method of controlling the rotation speed of a washing machine tub, comprising:
    receiving an indication of the actual tub rotation speed;
    comparing the actual tub rotation speed to a set point speed to calculate a speed error;
    determining the size of a load in the washing machine tub;
    determining at least one gain factor in response to the load size; and
    applying the at least one gain factor to the speed error to calculate a correction factor.

9. The method of claim 8, further comprising calculating a torque demand factor based on the speed error; wherein determining the size of the load includes determining the average torque demand factor.

10. The method of claim 8, further comprising varying the set point speed in response to the load size.

11. A method of controlling the rotation speed of a washing machine tub, comprising:
    receiving an indication of the actual tub rotation speed;
    comparing the actual tub rotation speed to a set point speed to calculate a speed error;
    determining at least one gain factor in response to the actual tub rotation speed; and
    applying the at least one gain factor to the speed error to calculate a correction factor.

12. The method of claim 11, wherein the gain factor is decreased as the tub rotation speed increases.

13. A system for controlling the rotation speed of a washing machine tub, comprising:
    a speed detection device operable to output an indication of the tub rotation speed;
    a controller coupled to the speed detection device to receive the indication of the tub rotation speed;
    a memory accessible by the controller and storing a speed demand value;
    the controller operable to compare the tub rotation speed to the speed demand to calculate a speed error and apply at least one gain factor to the speed error to calculate a correction factor, wherein the at least one gain factor is determined based on an indication of a load contained within the washing machine tub.

14. The system of claim 13, wherein the controller determines the at least one gain factor in response to the received indication of the tub rotation speed.

15. The system of claim 13, wherein the controller determines the at least one gain factor in response to the calculated speed error.

16. The system of claim 13, wherein the controller determines the at least one gain factor in response to the speed demand value.

17. The system of claim 13, wherein the controller determines the at least one gain factor in response to the correction factor.

18. The system of claim 13, wherein the at least one gain factor includes at least one of a proportional gain factor, an integral gain factor, and a derivative gain factor.

19. The system of claim 13, wherein the memory stores a matrix correlating predetermined gain factors with predetermined values indicating the tub load.

20. The system of claim 13, wherein:
    the speed detection device comprises a tachometer;
    the controller receives a predetermined number of pulses per rotation of the tub from the tachometer; and the predetermined number of pulses is varied in response to the tub speed.

21. The system of claim 13, wherein the controller varies the speed demand value in response to the indication of the load contained within the washing machine tub.

22. A clothes washing system comprising:

a cabinet;

a tub rotatably mounted within the cabinet;

a motor operably coupled to the tub for rotating the tub within the cabinet;

a speed detection device operable to output an indication of the tub rotation speed;

a controller coupled to the speed detection device to receive the indication of the tub rotation speed;

a memory accessible by the controller and storing a speed demand value; and the controller operable to compare the tub rotation speed to the speed demand to calculate a speed error and apply at least one gain factor to the speed error to calculate a correction factor, wherein the at least one gain factor is determined based on an indication of a load contained within the washing machine tub.

23. The clothes washing machine of claim 22, wherein the rotation speed detection device comprises a tachometer.

24. The system of claim 22, wherein the at least one gain factor includes at least one of a proportional gain factor, an integral gain factor, and a derivative gain factor.

* * * * *